United States Patent Office 3,368,457
Patented Feb. 13, 1968

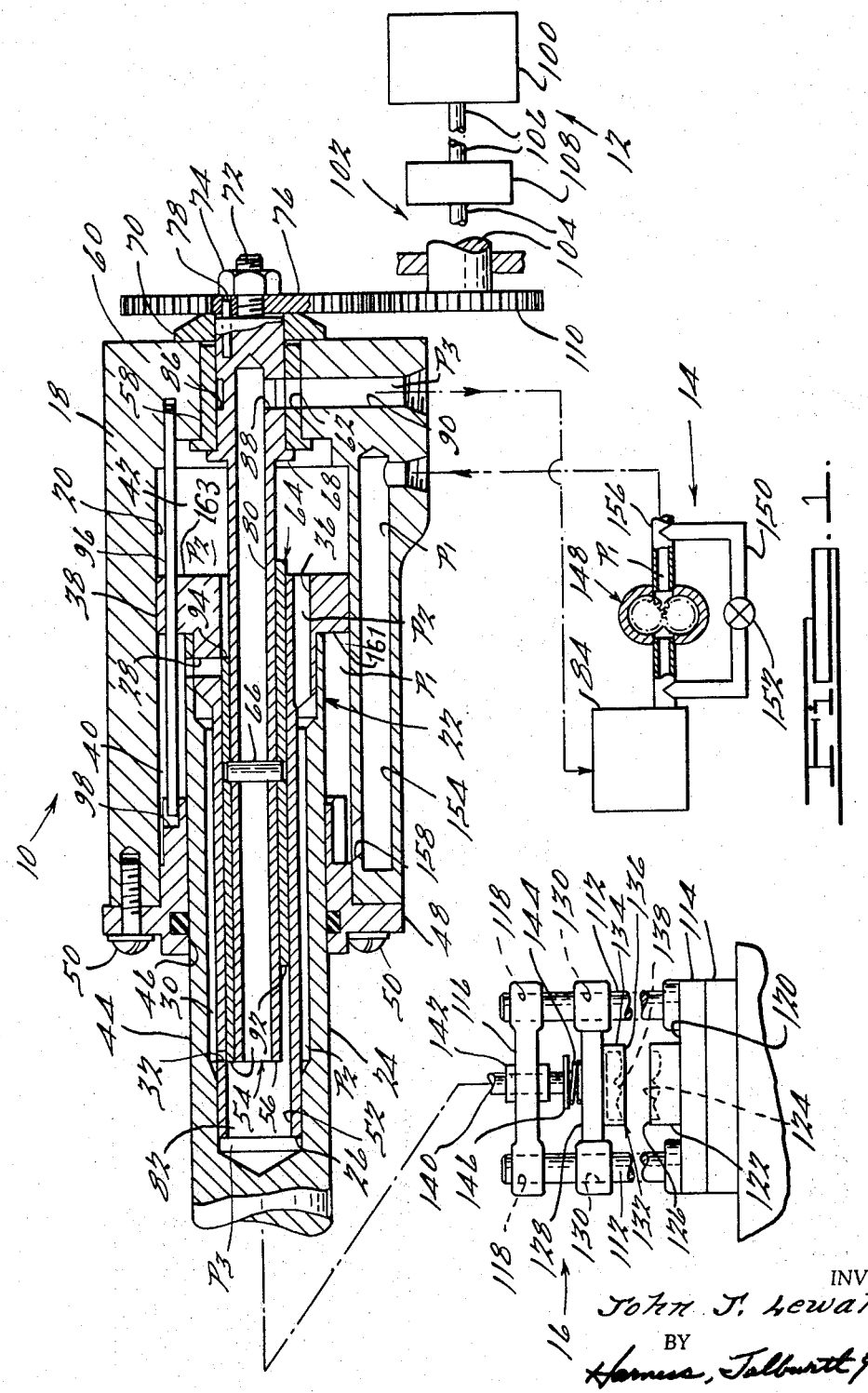

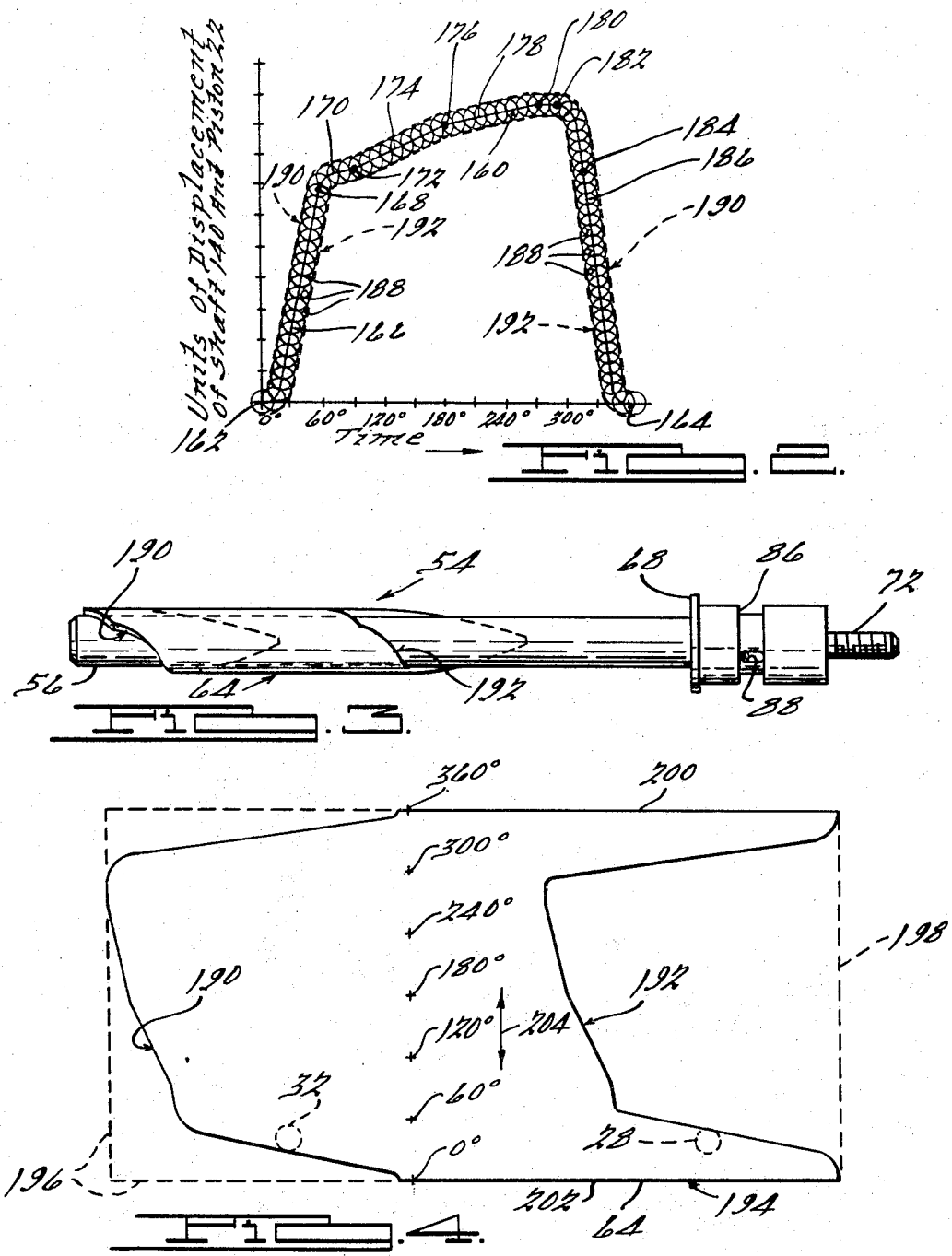

3,368,457
HYDRAULIC CONTROL ARRANGEMENT
John J. Lewakowski, Warren, Mich., assignor to Chrysler Corporation, Highland Park, Mich., a corporation of Delaware
Original application Aug. 19, 1964, Ser. No. 390,680. Divided and this application Jan. 17, 1967, Ser. No. 609,900
5 Claims. (Cl. 91—39)

ABSTRACT OF THE DISCLOSURE

A hydraulic control arrangement has a housing in which is received an axially slidable pressure responsive slave piston movable with respect to the housing. A plurality of axially spaced servo ports are formed in the slave piston in order to be movable therewith. A rotary servo valve is received within the slave piston and operatively journalled to the housing so as to be only rotatable with respect to the housing while being both rotatably and axially movable with respect to the slave piston. The rotary servo valve is provided with contoured edges which when rotated are effective for at least partially opening one of the servo ports while at least partially closing another of the servo ports thereby causing the slave piston to undergo axial movement in a direction tending to cause the servo port, which was previously more fully opened, to become more nearly closed and thereby establish a hydraulic null position of the slave piston. Additional motion transmitting means, such as gears, are provided for transmitting unidirectional rotary motion from a suitable motor means to the servo valve so as to rotate the servo valve unidirectionally and thereby establish cyclic operation of the slave piston.

Cross-reference to other application

This application is a division of copending U.S. application Ser. No. 390,680 filed Aug. 19, 1964, for Hydraulic Control Arrangement.

Background of the invention

In the past servo systems which were to have predetermined cyclic functions usually required the machining of at least one rotary cam which was used to actuate a cam-follower which, in turn, varied the degree of opening of a servo or pilot valve. Additionally, such arrangements often required motion or position-indicating feedback devices in an attempt to make a closed-loop servo system. These systems were not, however, a purely hydraulically closed-loop system because of the usual intervention and reliance upon mechanical linkages forming a portion of the closed-loop.

Such prior art servo systems are costly to manufacture and are subject to loss of accuracy during use because, for example, of the wear on the mechanical components comprising the system.

Summary of the invention

Essentially, the present invention resides in a hydraulic arrangement, for changing rotary mechanical motion into linear mechanical motion, wherein a movable pressure responsive member is exposed to at least two distinct fluid pressures directed thereagainst by a source of pressurized fluid. The pressure responsive member, provided with hydraulic ports which communicate with the distinct fluid pressures, is adapted for two directional linear movement. A rotary valving member, which is slidably and rotatably received within the pressure responsive member, is effective for varying the degree to which the hydraulic ports are opened in order to vary the magnitudes of the distinct fluid pressures thereby causing a correlative linear output movement of the pressure responsive member.

Accordingly, it is a general object of this invention to provide a servo system capable of being quickly and easily programmed so as to have the slave element produce an output in accordance with any desired operating parameter.

Another object of this invention is to provide in a programmed servo system hydraulic circuit means which constitute in toto a closed-loop.

Still another object of this invention is to provide in a servo system rotary servo valve means which cooperate with linearly movable servo port means for creating a displacement of the associated slave element.

Other more specific objects and advantages of this invention will become apparent when reference is made to the following description considered in conjunction with the drawings.

Description of the drawings

In the accompanying drawings:
FIG. 1 illustrates, in cross-section, a servo system constructed in accordance with the teachings of this invention and employed in combination with suitable power supplying means and power consuming means;
FIG. 2 is a graph illustrating a characteristic cyclic operating curve of the arrangement shown in FIG. 1;
FIG. 3 is an elevational view of a valve assembly comprising the servo system of FIG. 1; and
FIG. 4 is a view of one of the elements comprising the valve assembly of FIG. 3.

Description of the preferred embodiment

Referring now in greater detail to the drawings, FIG. 1 illustrates a servo system 10, constructed in accordance with the teachings of this invention, in combination with a motor control 12, a source of fluid pressure 14 and, illustrated in reduced scale, a press mechanism 16.

The servo system 10 is comprised of a housing 18 having a cylindrical chamber 20 formed therein which slidably receives a differential area slave piston 22. The piston 22 is comprised generally of telescoping portions 24 and 26 which when assembled in the manner illustrated, form a piston 22 having fluid flow passages 28, 30, 32 and 36 therein. The larger diameter 38 of piston 22 serves to divide the general chamber 20 into two variable but distinct chambers 40 and 42 which, as will be subsequently described, are at times interconnected by selected passage means. The smaller diameter 44 of piston 22 is slidably received through an aperture 46 formed within an end member 48 which is secured to the housing 18, as by screws 50, so as to generally define one axial end of the general chamber 20.

Telescoping member 26 of piston 22 has a conical bore defining an inner diameter 52 which closely receives therein a rotatable valve assembly 54. As will become apparent, piston 22 and valve assembly 54 are adapted so as to experience relative angular and axial motion therebetween.

Valve assembly 54 is comprised of an inner tubular member 56 closed at its right end and journaled for rotation as in a bushing 58, retained within end wall portion 60 of housing 18, which has formed therein a radially directed passageway 62. A valving element or annular land 64 is carried about tubular member 56 and is secured thereto as by a pin 66 so as to retain a predetermined axial and angular relationship with respect to tubular support 56.

The tubular support 56 is restrained against relative axial movement by means of an annular flange 68 disposed at one end of bushing 58 and a second flange 70 disposed at the other end of said bushing. The journaled end of tubular member 56 is provided with an extension 72 of reduced diameter which is preferably at least partly threaded so as to accommodate a nut 74 which serves to retain the flange member 70 and a gear 76 on the extension 72. A locating pin 78 may be employed for maintaining a predetermined relationship between gear 76 and tubular support 56.

Member 56 is provided with an elongated axially extending passageway or conduit 80. One end of conduit 80 communicates with chamber 82, defined generally by the closed left end of tubular piston member 24 and the inner diameter of piston member 26, while the other end communicates with an area of relatively low pressure as illustrated by a fluid reservoir 84. An annular groove 86, formed in the periphery of the journaled end of member 56, a radially directed passageway 88, also formed in said journaled end, passageway 62, in bushing 58, and conduit 90, in housing 18, cooperate to complete communication between conduit 80 and reservoir 84.

Valve element 64 has formed thereon at its opposite ends, valving or metering edges 92 and 94 which, as will become apparent, cooperate with ports 32 and 28 to determine the axial position of piston 22. An elongated rod 96 closely received by housing 18 and by a groove 98 of end member 48, serves as a guide or key for piston 22 by passing therethrough in a manner permitting of sliding motion therebetween.

A suitable driving means, such as an electric motor 100, is operatively connected through transmission means 102 with gear 76. The transmission means may be comprised of shafts 104 and 106, gear box 108 and gear 110 which is secured to shaft 104 and operatively engaged with gear 76. Preferably, the driving means 100 is of the type which is capable of maintaining substantially constant any selected operating speed or additional regulating means are provided for achieving such controlled speed characteristics.

The press mechanism somewhat schematically illustrated at 16 may be comprised generally of a plurality of vertically extending posts 112 suitably secured at their respective lowermost ends to the press base portion 114. The upper ends of the posts are secured to each other by a suitable connecting and support member 116 which may be secured to said posts as by post-receiving apertures 118. Situated generally between the posts 112 and atop the press table 120 is a lower die 122. A contoured die cavity 124 is formed generally within die 122 which also has a peripheral work-piece restraining surface 126.

An upper die shoe or ram member 128, slidably mounted on posts 112 as by bearing portions 130, carries an upper die assembly 132 comprised of an outer die body 134 with a peripheral work-piece restraining surface 136, and an inner die member 138 movable relatively to said die body 134.

A shaft 140, which may actually be an extension of piston 22, is slidably received through a bushing 142, in bridging member 116, and operatively connected to the ram 128, as by a spring 144 and a spring seat 146 on shaft 140, and to the inner upper die member 138.

Consequently, for purposes of illustration, ram 128, spring seat 146, spring 144, die body 134 and inner die member 138 can be considered as moving in unison with shaft 140 when said shaft is caused to move downwardly from the position shown. The upper die body 134 is thusly moved downwardly until it attains a position whereat it is in juxtaposition to lower die 122 and whereat the upper and lower workpiece restraining surfaces 136 and 126, effectively engage and restrain lateral movement of peripheral portions of said workpiece. Such abutting engagement of the die body 134 effectively precludes any further substantial downward movement of ram 128. However, because of the lost motion connection between shaft 140 and ram 128 as afforded by the spring 144, shaft 140 and upper die member 138 continue a downward movement until the workpiece contained between die members 122 and 138 is caused to conform to the respective die surfaces.

In manufacturing operations wherein such presses are employed, it is desirable to have the upward opening rate of travel of the ram 128 relatively fast, as well as the downward travel of the ram 128. As a consequence, the cycle time required for the production of a particular product, of that press, is maintained at a minimum. However, since many of such presses involve relatively great masses, provision must be made to decelerate the rate of travel of the ram at least in its downward stroke so as to prevent shock when the upper die assembly comes into contact with the workpiece and lower die 122. Further, the rate of travel of the inner die member 138 with respect to lower die 122 may be a variable rate throughout its working stroke in order to possibly enable some internal cam-dies (not shown) to complete their respective functions or permit proper workpiece material-flow to occur. As previously indicated, the press mechanism 16 is somewhat schematic and primarily intended to merely illustrate certain functions which the invention is particularly suited to perform.

The various fluid pressures encountered within the servo system 10 have importance only as to their relative magnitudes. Therefore, hereinafter pressure $P_1$ will designate the highest pressure, $P_3$, a reference pressure, is the lowest while $P_2$ is a variable intermediate pressure generally within the limits of $P_1$ and $P_3$.

The reservoir 84 supplies fluid at a pressure $P_3$ to a pump 148 which is capable of increasing the pressure of the fluid to at least $P_1$. A return bypass conduit 150 and suitable pressure regulating valve 152 may be provided in order to achieve a relatively constant maximum value of pressure $P_1$.

Conduit 154, which is in communication with the pump discharge conduit 156, serves to transmit fluid under pressure $P_1$ to conduit 158 and chamber 40.

Slave piston 22, partially withdrawn into chamber 20, is maintained in the position illustrated by equal and oppositely directed forces acting on the radial surfaces 161 and 163 of the larger diameter piston 38. That is, the greatest pressure $P_1$, applied against the smaller area of surface 161 equals the intermediate pressure $P_2$, applied against the larger area of surface 163. At this time, port 28, which is at a pressure $P_1$, is just covered by edge 94 of valve member 64; and port 32, which is at a pressure $P_2$, is just covered by edge 92 of valve member 64. Consequently, if pressure $P_2$ for some reason tends to increase relatively to pressure $P_1$, piston 22 becomes momentarily unbalanced resulting in a very slight movement thereof to the left. Such movement to the left causes port 28 to become completely closed or more nearly constricted (assuming that port 28 previously had a very slight flow rate into chamber 42) and causes port 32 to become more nearly completely opened. The opening of port 32, which is at a pressure $P_2$, results in a slight flow of fluid from chamber 42, through conduit 36, annular passage 30 and port 32 into chamber 82, conduit 80, passages 88 and 62, conduit 90 and into reservoir 84. This flow, even though possibly very slight, is sufficient to reduce pressure $P_2$ to the degree causing slave piston 22 to reverse its direction and move back to the right to the position illustrated which at the moment of equilibrium can be considered as at a null position. Preferably, although not absolutely necessary, ports 28 and 32 are of such a cross-sectional configuration and their locations are such as to permit a continual minute flow through ports 28 and 32 when they are in the null position.

Likewise, if pressure $P_2$ decreases relatively to pressure $P_1$, piston 22 moves a very slight amount to the right causing port 28 to become more fully open with respect to edge 94 and chamber 42 which results in pressure $P_2$ being increased by the feeding action of the relatively high pressure $P_1$ of chamber 40. (Port 32 is, of course more nearly closed as port 28 becomes more nearly open.) By increasing pressure $P_2$ in this manner, the stability of piston 22 is once more established. It should possibly be noted that the action described above constitutes a closed-loop system. That is, any relative variations between pressures $P_1$ and $P_2$ result in the slave piston 22 moving in a direction which will not only correct the pressure variation but will also cancel that movement of the piston which was required to bring about the pressure correction. For example, if the slave piston 22 moves to the right, communication between port 32 and chamber 82 is completely terminated. Consequently, as correction of pressure $P_2$ is taking place by flow of fluid through port 28, piston 22 is simultaneously experiencing movement back to the left which results in the closing off of port 28 and the establishment of a suitable null position.

Axial movement of the slave piston 22 can also be achieved by rotation of the valve assembly 54 by means of tubular support 56. Such rotation of valve 64 in effect causes what might be considered a generally axial displacement of the contoured metering edges 92 and 94. Rotation of tubular member 56 is, of course, accomplished through rotation of gear 76 and meshing gear 110. It should be noted, however, that rotation of the valve assembly 54 is not accomplished by corresponding rotation of the slave piston 22 because of the provision of rod or key 96. If, for purposes of illustration, the piston 22 is thought of as being physically held in the position shown in FIGURE 1, while the valving element 64 is rotated, it then becomes apparent that the contoured edges 92 and 94 would appear, when respectively viewed from ports 32 and 28, to be moving axially. Such tendency to relative motion between slave piston 22 and valving element 64 causes variations in the difference between pressures $P_1$ and $P_2$ as previously discussed. The subsequent correction of such induced pressure variations must be accomplished, as also previously discussed, by the axial movement of slave piston 22. Accordingly, in view of the above, it can be seen that a controlled displacement of slave piston 22 can be achieved through selective rotation of the valving member 64.

The invention as herein disclosed provides a novel method which enables the quick and accurate construction of servo valve assemblies as illustrated in FIGURE 1.

For purposes of illustration let it be assumed that the press mechanism 16 has a characteristic cyclic operating curve as indicated by curve 160 of the graph of FIGURE 2. Units of time comprising the cycle time would be along the axis of abscissas and would extend from time "zero" at point 162 to cycle finish at point 164. Plotted against time and along the ordinate axis would be units of axial displacement of shaft 140 or piston 22. (It should, of course, be apparent that the actual displacements of the shaft 140 and piston 22 may in fact be identical or they may be proportional to each other, which could easily be accomplished as by the interposition of suitable force or motion amplifying therebetween.) From a brief inspection of FIGURE 2 it can readily be seen that shaft 140 will, during one cycle, undergo a number of changes in velocity requiring appropriate accelerations and decelerations.

Under the assumed conditions, for example, and further assuming that the position of shaft 140 and ram 128 as shown in FIGURE 1 is represented in FIGURE 2 by point 162, the characteristic curve 160 shows that the initial downward velocity of shaft 140 is to be relatively low and rapidly increase in accordance with curve portion 166 until it reaches a point 168.

Point 168 could represent that displacement of shaft 140 necessary to place the workpiece-engaging surface 136 of upper die body 134 slightly above the workpiece which, in turn, would be atop surface 126. It can be seen from curve portion 170 that subsequent to point 168 the velocity of shaft 140 is materially reduced. This would be done, for example, in order to avoid shock when the upper die body workpiece engaging surface 136 finally abuts against and engages the workpiece which could be represented by point 172.

Additional displacement of shaft 140 subsequent to point 172 would not cause a corresponding displacement of ram 128 but merely lower upper inner die member 138 at a velocity in accordance with curve portion 174 to point 176. During this period of operation it is quite conceivable that shaft 140 would undergo varying velocities as illustrated by curve portions 174 and 178 and even experience a momentary substantially motionless dwell period as between points 180 and 182.

Subsequent to point 182, shaft 140 starts to rise in accordance with curve portion 186, between points 182 and 164, and as it reaches a point 184, equivalent to point 172, start to raise ram 128.

Once the characteristic operating curve has been empirically established, it is a very simple matter to construct therefrom, the valving member 64. For example, referring again to FIGURE 2, let it be assumed that ports 32 and 28 are of the same cross-sectional configuration and size and that circle 188 of FIGURE 2 is the shape and size of ports 28 and 32. If a plurality of such circles 188 are drawn so as to be in overlapipng relationship to each other and so as to have their respective centers coincident with the operating curve 160, two separated boundary lines 190 and 192 can be constructed by drawing such lines so as to be tangent to the circle 188 as shown in FIGURE 2. If desired, the time represented by the span between points 162 and 164 can also be considered as constituting 360 degrees of rotation. Accordingly, the graph of FIGURE 2 could, if desired, be placed on a cylinder having its axis of revolution parallel to the ordinate axis thereby resulting in points 162 and 164 becoming coincident.

In view of the above, let it be assumed that in FIGURE 4, 194 represents a substantially flat and rectangular piece of formable material having ends 196 and 198 as indicated generally by the dash-lines. Next, ends 196 and 198 are formed so as to have, respectively, the configurations of boundaries 190 and 192 therein. If the distance between edges 200 and 202 is equated to 360°, then it becomes apparent that all of the points of boundaries 190 and 192 maintain the same relationship to each other as that shown by FIGURE 2.

If ports 28 and 32 are now located as shown and if it is assumed that the cam or valve member 64 is capable of movement only in the directions of arrows 204, then it becomes evident that as member 64 is moved upwardly or downwardly, that the slave member in which ports 28 and 32 are formed will move so as to have both ports 32 and 28 substantially tangent to the curves or edges 190 and 192, respectively. The same related reaction can be obtained by forming member 64 into tubular form and mounting it on a mandrel or other rotary support such as 56. If member 64 is made of metal, it is preferable that the outer diameter be ground as nearly circular in cross-section as practical in order to obtain the best sliding fit with the slave 22.

In view of the above, it can be seen that assuming motor 100 to be of some constant speed type that motor 100 can be employed for rotating gears 110 and 76 so as to rotate in turn valve assembly 54 as previously described, such rotation of said valve assembly in turn causes axial displacement of the slave 22 which is illustrated in FIGURE 1 can be operatively connected to some other consuming device such as the press mechanism 16.

In considering this operation in greater detail, it can be seen that if gear 110 is rotated in a clockwise direction (as viewed from the motor end of shaft 104) then gear 76 and valve assembly 54 will be rotated counterclockwise. In terms of FIGURE 4 and the arrow 204 such counterclockwise rotation of valving member 64 would be reflected in a downward movement of said valving member in FIGURE 4 since ports 28 and 32 as previously described are confined to movement only in the axial direction, which when considered in FIGURE 4, would mean only in a horizontal direction, such ports would have to move laterally to the left some suitable distance until they once more achieve the position wherein they are substantially respectively tangent to the curves or edges 192 and 190. Such lateral movement of ports 28 and 32 are, of course, axial when viewed in FIGURE 1 thereby causing the slave piston 22 to be displaced some control amount to the left which as diagrammatically illustrated would cause a downward movement of shaft 140.

It can be seen that if motor 100 maintains its motion regardless of whether such motion is constant or variable, valving assembly 54 will also continue its rotation causing slave piston 22 to reciprocate within the confines of chamber 20 in accordance with the motion as programmed by the valving member 64. Consequently it is conceivable that the servo system as herein discussed would be suitable in such situations, as for example, progressive die installations wherein a plurality of distinct operations are performed at a variety of stations as the workpiece is being fed intermittently through the die and wherein it is not normally necessary to have manual placement and removal of the workpiece. Consequently, the operation becomes one which is highly repetitive requiring interruption of the ram motion only during periods of desired shutdown.

Various control devices can also be used in combination with the invention herein discussed. For example, if desired, speed sensing devices may be included with, for example, slave piston 22 or shaft 140 or even one of the gears 76 or 110 which would function to feed back proper signals to the motor 100 in order to closely regulate the speed of the motor.

It should, of course, be obvious that the invention as herein discussed, is not intended to be limited to the precise configuration of the valving element 64. On the contrary, it is contemplated that in practice the contours of valving elements, such as 64, would in every case be determined empirically as described with reference to FIGURES 2 and 4.

Among the many benefits of this invention are such things as the ability of having a basic servo system which is suited to be quickly changed if circumstances dictate a change in operating characteristics. That is, it is conceivable that a single servo system can perform many differentiating operations at different times by having interchangeable valve assemblies, such as 54, requiring simply the removal of one valve assembly and the installation of another assembly with a different valve member 64. Further, very small forces are encountered by the valve assembly 54. The only real force involved is that required to rotate that valve assembly which can be very slight. The working power of the slave piston is provided by the fluid pressure supply system as indicated schematically at 14.

Although only one preferred embodiment of the invention has been disclosed and described, it is apparent that various embodiments and modifications of the invention are possible within the scope of the appended claims.

I claim:
1. In combination,
   (A) a housing containing an axially extending chamber for a piston,
   (B) a piston movable axially within said chamber,
   (C) fluid control means for actuating said piston comprising valve means and port means movable rotatably and axially with respect to each other,
   (D) means operably connecting one of the latter two means with said piston for moving axially therewith,
   (E) means operably connecting the other of said latter two means with said housing for remaining in fixed axial relationship therewith,
   (F) means for effecting relative rotation between said latter two means,
   (G) said port means comprising a fluid inlet port and a fluid exhaust port spaced axially from each other and communicating with one side of said piston for supplying pressurized fluid thereto and for exhausting said fluid therefrom respectively,
   (H) said valve means comprising an annularly arranged valve land noramlly disposed between said axially spaced inlet and exhaust ports at a null position with respect thereto and having axially spaced contoured edges adjacent and cooperating with said ports respectively at said null position,
       (1) to maintain said pressurized fluid at said one side of said piston at a predetermined null condition and, upon said relative rotation between said port and valve means from said null position,
       (2) to close one of said ports and open the other to actuate said piston to move the same axially to return said valve and port means to said null position,
       (3) every portion of each of said contoured edges being spaced axially from every portion of the other of said contoured edges.

2. In the combination according to claim 1, said edges being contoured to effect a null position with respect to said ports for at least one axial position of said piston within its operating limits for every relative rotational position of said land and ports.

3. In the combination according to claim 1, the axially spaced edges of said land normally overlapping and closing both said inlet and exhaust port at said null position.

4. In the combination according to claim 1, said piston comprising a differential area piston and said one side of said piston having a larger effective area than the opposite side of said piston, and fluid inlet means in communication with both said inlet port upstream of said land and said opposite side of said piston for supplying said pressurized fluid continuously to said opposite side and selectively to said one side in accordance with said relative rotation.

5. In the combination according to claim 4, and each of said edges extending annularly throughout a full circle to comprise a continuous cyclic cam beginning and ending at the same point, thereby to effect repetitive cyclic operation of said piston upon said relative rotation continuously in the same direction.

References Cited
UNITED STATES PATENTS

| | | | |
|---|---|---|---|
| 2,211,483 | 8/1940 | Tyler | 91—35 X |
| 2,324,750 | 7/1943 | Wiedmann | 91—417 X |
| 2,434,668 | 1/1948 | May | 91—375 |
| 2,898,890 | 8/1959 | Lynott | 91—375 X |
| 3,026,854 | 3/1962 | Wiedmann | 91—417 X |
| 3,238,622 | 3/1966 | Bullard | 91—37 X |

MARTIN P. SCHWADRON, *Primary Examiner.*

EDGAR W. GEOGHEGAN, *Examiner.*

G. N. BAUM, *Assistant Examiner.*